(No Model.)
G. LEDER.
APPARATUS FOR EXTRACTING OIL FROM COTTON AND OTHER SEED.
No. 307,123. Patented Oct. 28, 1884.
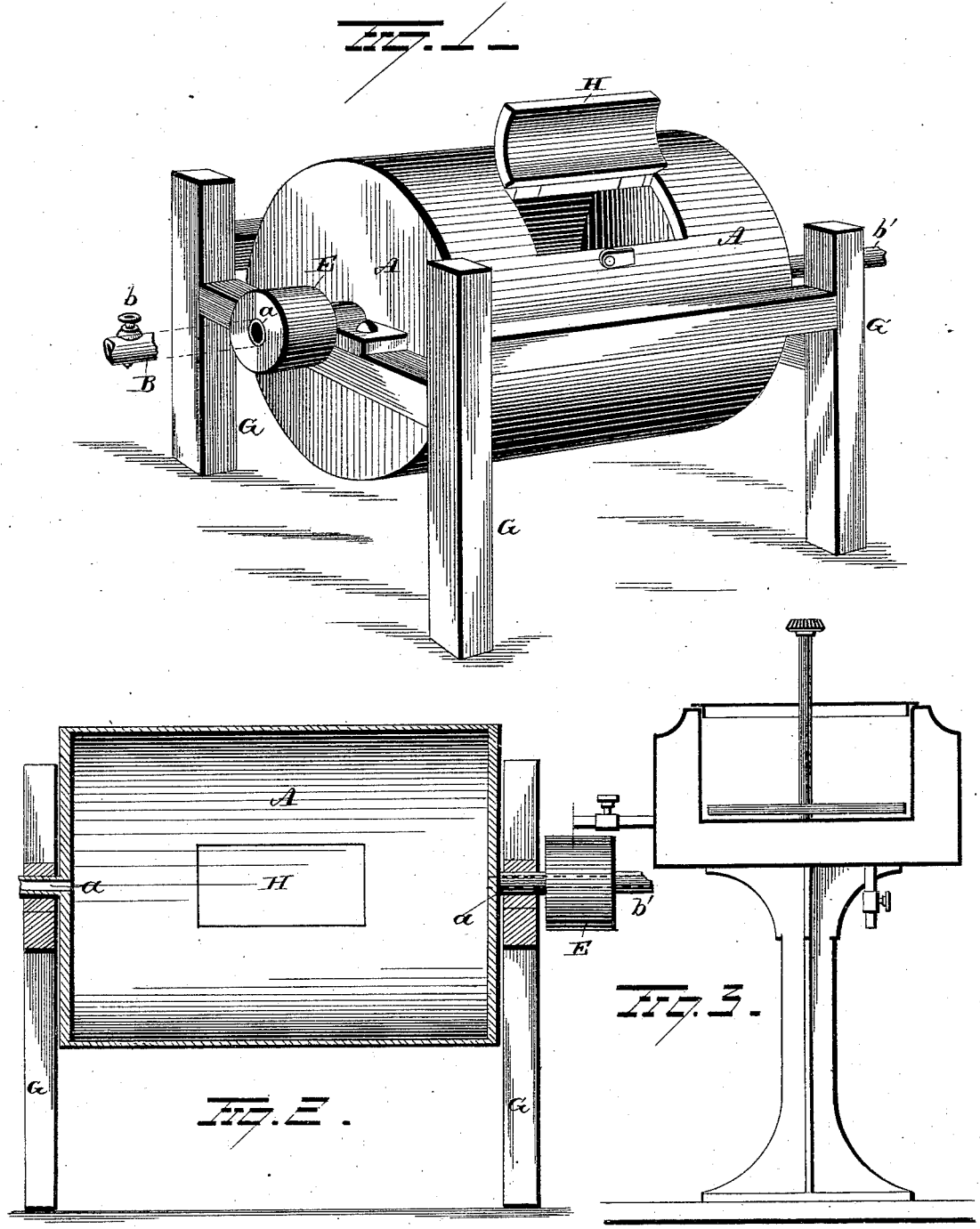
WITNESSES
S. G. Nottingham
George F. Downing
INVENTOR
George Leder
Attorney

UNITED STATES PATENT OFFICE.

GEORGE LEDER, OF DEMOPOLIS, ALABAMA.

APPARATUS FOR EXTRACTING OIL FROM COTTON AND OTHER SEED.

SPECIFICATION forming part of Letters Patent No. 307,123, dated October 28, 1884.

Application filed December 18, 1883. (No model.)

*To all whom it may concern:*

Be it known that I, GEORGE LEDER, of Demopolis, in the county of Marengo and State of Alabama, have invented certain new and useful Improvements in Apparatus for Extracting Oil from Cotton and other Seed; and I do hereby declare the following to be a full, clear, and exact description of the invention, such as will enable others skilled in the art to which it appertains to make and use the same.

My invention relates to an improvement in apparatus for extracting oil from cotton and other seed. Heretofore an apparatus for moistening and stirring crushed cotton-seed has been constructed as follows: A stationary receptacle, provided with a steam jacket, has depending therein two hollow arms through which steam enters the receptacle and mingles with the crushed seed placed therein. The depending hollow arms are mounted on a shaft that extends down through the bottom of the receptacle, said shaft being rotated by suitable gearing, so as to stir the crushed seed while it is subjected to the action of steam. This construction of apparatus is defective, owing to the fact that it is exceedingly difficult to pack the shaft at the point of its passage through the bottom of the receptacle, and also from the fact that the crushed seed works into the joint around the pipe and interferes with the rotation of the arms. Another objectionable feature is the difficulty encountered in removing the seed from the receptacle.

The object of my invention is to obviate the defects and objectionable features above noted, and provide an apparatus which shall be simple and economical in its construction, require but comparatively little power to operate it, and of such construction that the seed may be readily placed therein and removed therefrom. With these ends in view, my invention consists in a revolving drum provided with one or more doors and with hollow bearings for the entrance and exit of steam.

My invention further consists in certain features of construction and combinations of parts as will be fully described, and pointed out in the claim.

In the accompanying drawings, Figure 1 is a view in perspective of the moistener, and Fig. 2 is a longitudinal sectional view. Fig. 3 is a view of the heater.

A represents a drum made of suitable material and any desired dimensions. This drum is provided with tubular bearings $a$, by means of which it is journaled in the supporting-frame G. The drum A is further provided with the doors H, situated diametrically opposite, or in any other convenient positions for putting in and taking out the meal. The steam-pipe B, provided with the throttle-valve $b$, enters the drum A through one of the tubular bearings, $a$, and an exhaust-pipe, $b'$, is placed in the other tubular bearing. The bearings $a$ are provided with the band-pulleys E, mounted fixedly thereon, which are connected with driving-pulleys on a counter-shaft, (not shown.) The crushed cotton-seed or linseed is first placed in the drum A, and while the drum revolves, causing the meal or crushed seed to fall from side to side, the steam is turned on by means of the valve $b$ and enters the drum A through the pipe B, whereby the meal becomes exposed to the steam and moistened thereby. From the drum A the moistened meal is taken to the heater represented in Fig. 3, where it is thoroughly cooked by means of dry steam before it is subjected to pressure.

I wish it to be understood that the process herein described forms no part of the invention herein set forth, said process being the subject-matter of another application filed of even date herewith. The bearing of the inside of the tubular bearing $a$ upon the steam-pipe is not necessarily steam-tight, nor is it advisable to make it so, as the expense of the apparatus would be thereby increased without any corresponding benefit, since the steam which escapes around this bearing will form but a part of the exhaust necessary.

It is evident that slight modifications may be made in the construction of this moistener without departing from the spirit and scope of my invention—such, for example, as placing projections or arms within the revolving-drum to more thoroughly disintegrate the lumps of meal, and having only a single band-pulley mounted on one of the tubular bearings; also, the drum might be made octagonal or any other desired angular shape in cross-section. Hence, I do not wish to confine myself strictly to the construction herein set forth; but, Having fully described my invention, what I claim as new, and desire to secure by Letters Patent, is—

In an apparatus for the treatment of cotton-seed and linseed, the combination, with a revolving drum provided with one or more doors, of tubular trunnions constituting steam inlet and exhaust passages, substantially as set forth.

In testimony whereof I have signed this specification in the presence of two subscribing witnesses.

GEORGE LEDER.

Witnesses:
R. E. CORRY,
W. P. CHENEY.